（12）United States Patent
Abehasera

(10) Patent No.: US 8,975,764 B1
(45) Date of Patent: Mar. 10, 2015

(54) ELECTRONIC CIGARETTE WITH INTEGRATED CHARGING MECHANISM

(76) Inventor: Benyamin Abehasera, Hollywood, FL (US)

( * ) Notice: Subject to any disclaimer, the term of this patent is extended or adjusted under 35 U.S.C. 154(b) by 437 days.

(21) Appl. No.: 13/306,231

(22) Filed: Nov. 29, 2011

Related U.S. Application Data

(60) Provisional application No. 61/458,675, filed on Nov. 29, 2010.

(51) Int. Cl.
*F03G 7/08* (2006.01)

(52) U.S. Cl.
USPC .................... 290/1 R; 128/202.21; 131/273

(58) Field of Classification Search
CPC ..... A61M 15/06; A24F 47/002; A24F 47/008
USPC ...... 290/1 R, 1 A; 128/202.21; 131/330, 273, 131/270, 194
See application file for complete search history.

(56) References Cited

U.S. PATENT DOCUMENTS

| | | | | |
|---|---|---|---|---|
| 5,341,055 A * | 8/1994 | Roche | | 310/24 |
| 5,347,186 A * | 9/1994 | Konotchick | | 310/17 |
| 5,818,132 A * | 10/1998 | Konotchick | | 310/17 |
| 6,220,719 B1 * | 4/2001 | Vetorino et al. | | 362/192 |
| 6,313,551 B1 * | 11/2001 | Hazelton | | 310/12.24 |
| 6,812,583 B2 * | 11/2004 | Cheung et al. | | 290/1 R |
| 6,854,470 B1 * | 2/2005 | Pu | | 131/273 |
| 7,498,681 B1 * | 3/2009 | Kellogg et al. | | 290/1 R |
| 7,498,682 B2 * | 3/2009 | Lemieux | | 290/1 R |
| 7,692,320 B2 * | 4/2010 | Lemieux | | 290/1 R |
| 7,810,505 B2 * | 10/2010 | Yang | | 131/194 |
| 7,989,971 B2 * | 8/2011 | Lemieux | | 290/1 R |
| 8,511,318 B2 * | 8/2013 | Hon | | 131/273 |
| 8,629,572 B1 * | 1/2014 | Phillips | | 290/53 |
| 8,851,068 B2 * | 10/2014 | Cohen et al. | | 128/202.21 |
| 2009/0126745 A1 * | 5/2009 | Hon | | 131/273 |
| 2012/0048266 A1 * | 3/2012 | Alelov | | 128/202.21 |

\* cited by examiner

*Primary Examiner* — Tulsidas C Patel
*Assistant Examiner* — Viet Nguyen
(74) *Attorney, Agent, or Firm* — Gold & Rizvi, P.A.; Glenn E. Gold

(57) ABSTRACT

A power generating electronic cigarette includes a partially hollowed body having an enclosed distal end, and a filter cartridge attached at a proximal end of the body. The cigarette operates using power stored within a portable power storage media integrated within the body. A power generating subassembly is located within the hollowed body, wherein the power generating subassembly generates an electrical current to charge the power storage media. The power generating subassembly utilizes motion of a magnet in proximity of a coil to generate an electrical current within the coil. The current can be converted into stored electrical power. Motion of the magnet can result from shaking or rolling the electronic cigarette. Alternately, the magnet can be rotated by an airflow driven device operated by airflow applied to the cigarette.

20 Claims, 5 Drawing Sheets

ELECTRONIC CIGARETTE WITH INTEGRATED CHARGING MECHANISM

CROSS-REFERENCE TO RELATED APPLICATION

This Non-Provisional Utility application claims the benefit of U.S. Provisional Patent Application Ser. No. 61/458,675, filed on Nov. 29, 2010, which is incorporated herein in its entirety.

FIELD OF THE INVENTION

The present disclosure generally relates to an electronic cigarette or any other inhaling device. More particularly, the present disclosure relates to an electronic cigarette comprising an integrated charging mechanism which generates electrical power which is stored within a portable power storage media for providing electrical power to the electronic cigarette during operation.

BACKGROUND OF THE INVENTION

An electronic cigarette, or e-cigarette, is an electrical device that simulates the act of tobacco smoking without burning tobacco. The electronic cigarette accomplishes this by producing an inhaled mist bearing the physical sensation and appearance of inhaled tobacco smoke. The device uses heat (or in some cases, ultrasonics) to vaporize a propylene glycol- or glycerin-based liquid solution into an aerosol mist, similar to the way a nebulizer or humidifier vaporizes solutions for inhalation. The primary stated use of the electronic cigarette is an alternative to tobacco smoking.

Most electronic cigarettes are portable, self-contained cylindrically shaped devices designed to resemble actual cigarettes, cigars, and the like. Most electronic cigarettes utilize reusable parts including replaceable and/or refillable components, whereas lower cost devices can be disposable. The sizes of the electronic cigarettes can vary to support different battery capacities.

The electronic cigarette includes three key components:
a. A "cartridge", which serves as a mouthpiece and usually, doubles as a small reservoir holding the liquid that is vaporized during use. The cartridge is normally replaceable.
b. An "atomizer", which serves as a heating element responsible for vaporizing the liquid.
c. A power unit, which includes a portable power source and other electronic components necessary for operation. The portable power source is commonly a battery.

Each of the key components can be integrated into a single assembly or fabricated as separate subassemblies that are assembled together using electro-mechanical couplers.

The electronic cigarettes are commonly charged through a combination filter and charging electromechanical interface. The charging process requires an external power source and a charging cable. The use of the electronic cigarette dictates at least one of inclusion of a sufficient stored power capacity, remembering to adequately charge the electronic cigarette prior to use, and toting the external power source and a charging cable in order to ensure the electronic cigarette is available for use as desired. The current configuration becomes limiting when the individual desires to use the electronic cigarette and the stored power has been depleted. The process of recharging the electronic cigarette is limited, requiring the user to couple the charging cable to the external power source and wait until the unit obtains a sufficient charge for use.

What is desired is an electronic cigarette enabling recharging of an internal power storage device by simply shaking the electronic cigarette, passing an airflow across a charging element provided within the electronic cigarette, and applying an external driving element to an internally located charging element.

SUMMARY OF THE INVENTION

The basic inventive concept provides a power generating electronic cigarette.

A first aspect of the present invention provides a power generating electronic cigarette comprising:
 an elongated electronic cigarette body comprising a tubular structure having a proximal end and an enclosed distal end, and being at least partially hollow so as to define a cavity between the proximal and distal ends;
 a filter cartridge configured to provide consumable components of the power generating electronic cigarette, the filter cartridge being attached at the proximal end of the tubular structure of the elongated electronic cigarette body;
 a portable power storage media configured to store electrical power to operate the consumable components of the filter cartridge, the portable power storage media being assembled within the tubular structure of the elongated electronic cigarette body; and
 a power generating subassembly comprising components disposed in a charging circuit with the portable power storage media, the components being configured to interact with one another and generate electrical power, in response to a motive force applied to at least one of the components, to transfer electrical power via the charging circuit to replenish the electrical power stored within the portable power storage media, the components of the power generating subassembly being assembled within the cavity of the tubular structure of the elongated electronic cigarette body.

A second aspect incorporates a linearly moving magnet and electrical coil combination into the power generating subassembly.

In another aspect, the linearly moving magnet is slideably assembled within an interior defined by the electrical coil, wherein power is generated when the magnet slides though the coil interior.

In yet another aspect, a first dampening member is provided between the linearly moving magnet and a proximal end of the respective element retaining cavity.

In yet another aspect, a second dampening member is provided between the linearly moving magnet and a distal end of the respective element retaining cavity.

In yet another aspect, power is generated by shaking the power generating electronic cigarette in a motion parallel to a longitudinal axis thereof.

In yet another aspect, a refill filter cartridge is removably attached to the power generating electronic cigarette via the electromechanical filter coupling element.

In yet another aspect, the portable power storage media is selected at least one of a battery, a capacitor, and the like.

A second embodiment of the power generating subassembly incorporates a magnet rotationally assembled within an inner channel formed by windings of an electrical coil.

In yet another aspect, the power generating subassembly further comprises at least one coil periphery magnet, wherein the coil periphery magnet is located externally of the coil windings.

In yet another aspect, the power generating subassembly further comprises a plurality of coil periphery magnets. The coil periphery magnets are preferably spatially arranged about the periphery of the coil windings.

In yet another aspect, power is generated by providing airflow within the power generating electronic cigarette, the airflow being in a direction that is substantially parallel to a longitudinal axis thereof.

In yet another aspect, the airflow causes the airflow driven rotator to rotate, which in turn causes the rotating magnet to rotate.

In yet another aspect, airflow is provided during a process of at least one of inhaling and exhaling.

A third embodiment of the power generating subassembly incorporates at least one linearly moving magnet slideably assembled within an inner passage formed by windings of an electrical coil and an airflow driven actuator comprising a blade assembly with at least one blade comprising a magnetically polarized element. The interaction of the rotation of the magnetically polarized element and the linearly moving magnet during rotation of the blade assembly causes the linearly moving magnet to oscillate within the electrical coil.

In yet another aspect, blade assembly includes a pair of magnetically polarized elements, wherein the magnetically polarized elements are oriented with the polarity facing in opposite directions. In operation, the first magnetically polarized element attracts the linearly moving magnet towards the blade assembly and the second magnetically polarized element repels the linearly moving magnet away from the blade assembly.

In yet another aspect, the power generating subassembly further comprises a biasing return member to counteract a magnetic force applied to the linearly moving magnet by the magnetically polarized element.

In yet another aspect, the power generating subassembly incorporates a pair of magnets, each magnet slideably assembled within an inner passage formed by windings of an electrical coil.

In yet another aspect, the power generating subassembly incorporates a non-magnetic barrier located between each linearly moving magnet and the blade assembly.

A fourth embodiment of the power generating subassembly incorporates at least one rotationally moving magnet rotationally assembled within an inner portion formed by windings of an electrical coil and a wireless power actuator comprising a series of fixed actuator magnets. The user locates the wireless power actuator proximate the electronic cigarette body and rotates the wireless power actuator along an axis parallel to a longitudinal axis of the electronic cigarette body, which causes the rotationally moving magnet to rotate within the electrical coil, which generates an electrical current within the electrical coil.

In yet another aspect, the rotationally moving magnet is a spherically shaped magnet.

In yet another aspect, the rotationally moving magnet is a cylindrically shaped magnet.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
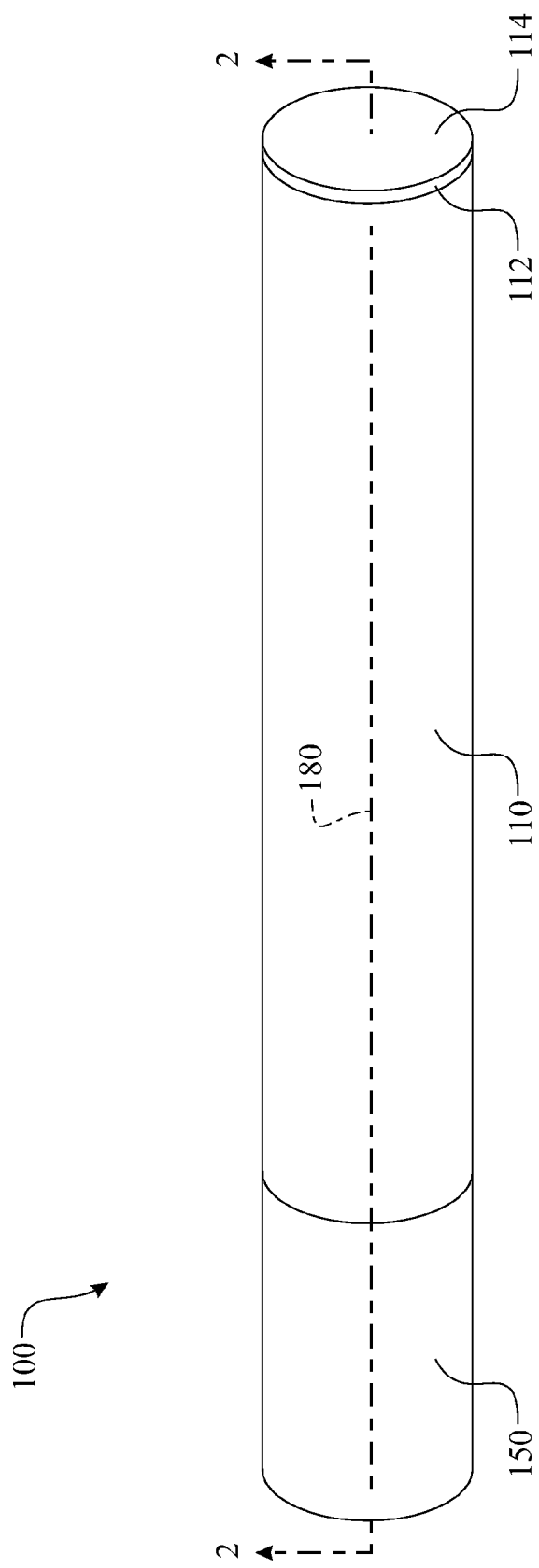
FIG. 1 presents an isometric view of a first exemplary embodiment of a power generating electronic cigarette.
Figure 2:
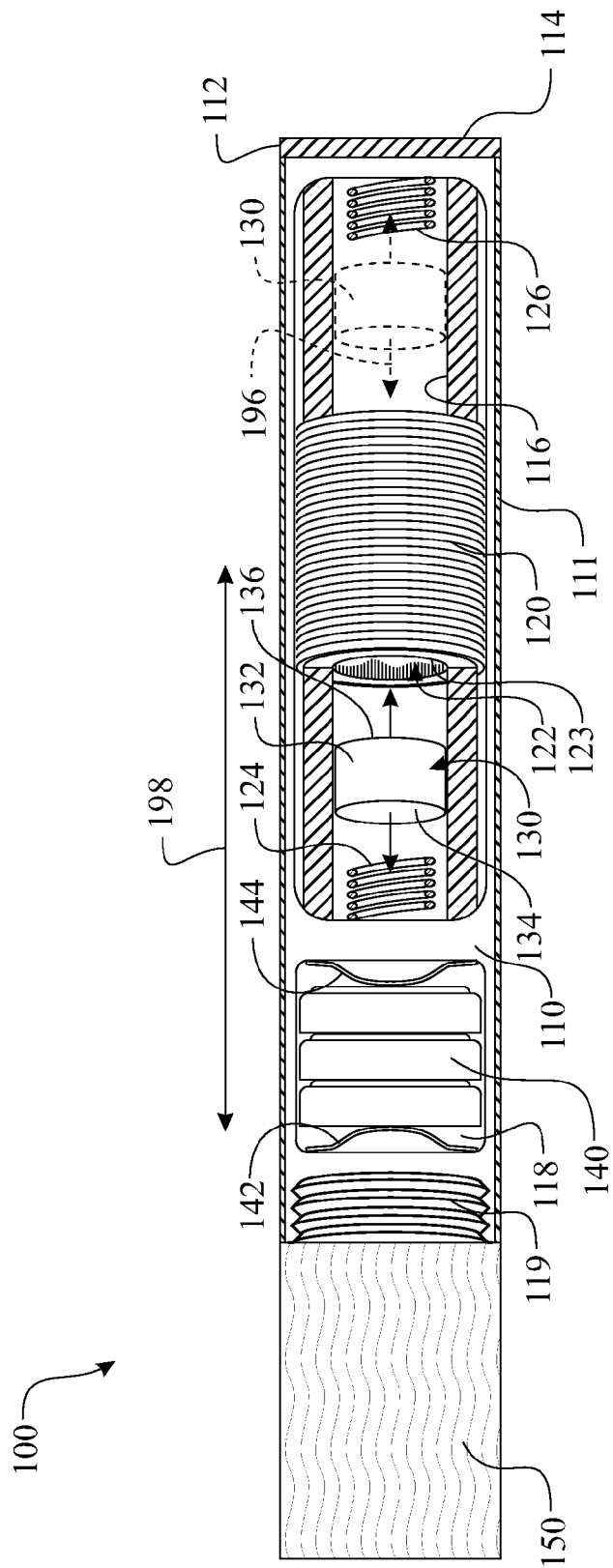
FIG. 2 presents a sectioned side view of the power generating electronic cigarette originally introduced in FIG. 1, the section being taken along section line 2-2 of FIG. 1.

A power generating electronic cigarette 100, in accordance with a first exemplary embodiment, is presented in FIGS. 1 and 2. The power generating electronic cigarette 100 is segmented in two components, an elongated electronic cigarette body 110 and a filter cartridge 150 which may take the form of a replaceable refill filter cartridge. The elongated electronic cigarette body 110 includes the power and non-consumable components of the power generating electronic cigarette 100. The elongated electronic cigarette body 110 is fabricated of a hollow or partially hollow tubular structure which may have an electromechanical filter coupling element 119 assembled at a proximal end of the tubular structure of the elongated body 110 and an enclosed tip 112 which may take the form of an illuminating element assembled at a distal end of the tubular structure of the elongated body 110. The tubular structure of the elongated electronic cigarette body 110 can be fabricated having an internal frame defining one or more cavities 116, 118 and a hollow external shell 111 that slides over the internal frame. The refill filter cartridge 150 provides the consumable components of the power generating electronic cigarette 100 in a form of a replaceable cartridge. The refill filter cartridge 150 is removably attached to the tubular structure of the elongated body 110 of the power generating electronic cigarette 100 via the electromechanical filter coupling element 119. An illuminated tip cover 114 is assembled to the distal end of the elongated electronic cigarette body 110 covering the illuminating element of the enclosed tip 112. The illuminated tip cover 114 can be clear or tinted, wherein the illuminated tip cover 114 is preferably fabricated of a translucent material having a red hue. The enclosed illuminating element tip 112 (such as a red light emitting diode (LED)) and illuminated tip cover 114 provides a burning effect during operation of the electronic cigarette 100.

The power generating electronic cigarette 100 can be fabricated in any of a variety of configurations without deviating from the spirit and intent of the present invention. It is understood that the refill filter cartridge 150 can be integrated into the power generating electronic cigarette 100, eliminating the electromechanical filter coupling element 119. The power generating electronic cigarette 100 can be offered with either the electromechanical filter coupling element 119 or a filter cartridge located at a proximal end of the elongated electronic cigarette body 110. The elongated electronic cigarette body 110 can be configured with or without the illuminating element of the enclosed tip 112. The enclosed tip 112, without the illuminating element tip, still will provide a barrier for moisture, contaminants, and the like.

The power generating electronic cigarette 100 requires power for operation. The currently offered products utilize a power storage media that is recharged by connecting a power charging cable (not shown) between the electromechanical filter coupling element 119 and a power source, such as a wall outlet, a vehicle power outlet, an external battery pack, and the like. This limitation dictates that the user carries the charging cable and has access to the respective power source in order to recharge the power storage media. The elongated electronic cigarette body 110 includes a power generating subassembly integrated within an electrical generator cavity 116 of the elongated electronic cigarette body 110, wherein the power generating subassembly generates an electrical output when subjected to a charging shaking motion 198.

The power generating subassembly creates an electrical power output to replenish electrical power stored within a portable power storage media 140. The power generating subassembly includes a linearly moving magnet 130 slideably assembled within a coil inner passage 122 of an electrical coil 120. The electrical coil 120 can span a portion or the entire length of the electrical generator cavity 116. A coil lining 123 or any other non-magnetic sleeve (not shown) can be inserted between the coil inner passage 122 and the linearly moving magnet 130 to improve longevity of the elongated electronic cigarette body 110, reduce friction between the linearly moving magnet 130 and the electrical coil 120, and the like.

The linearly moving magnet 130 is shaped including a magnet exterior surface 132 terminating between a magnet first end 134 and a magnet second end 136. The magnet exterior surface 132 is sized and shaped to slide within the coil inner passage 122.

In operation, the user shakes the elongated electronic cigarette body 110 in accordance with a charging shaking motion 198, wherein the charging shaking motion 198 is substantially parallel with a longitudinal axis 180 of the elongated electronic cigarette body 110. The motion causes the linearly moving magnet 130 to move in accordance with a magnet sliding motion 196. As the linearly moving magnet 130 slides through the coil inner passage 122, the sliding motion of the linearly moving magnet 130 creates a current along the windings of the electrical coil 120. The current can be converted into stored electrical power.

The portable power storage media 140 can be any portable electrical storage media, including a battery, a capacitor, and the like. The portable power storage media 140 and respective components can be assembled within a power storage cavity 118. An electrically conductive material (not shown, but well understood by those skilled in the art) is provided between the electrical coil 120 and the portable power storage media 140. In the exemplary embodiment, a first power contact 142 provides electrical communication with a first electrical terminal of the portable power storage media 140 and a second power contact 144 provides electrical communication with a second electrical terminal of the portable power storage media 140. The circuit created by the electrical coil 120, the electrically conductive material, the first power contact 142, and the second power contact 144 provides a charging circuit to replenish electrical energy within the portable power storage media 140.

A first dampening member 124 and a second dampening member 126 can be located proximate each respective end of the electrical generator cavity 116. The dampening members 124, 126 decelerate the linearly moving magnet 130 as the linearly moving magnet 130 approaches each respective end of the electrical generator cavity 116. The dampening members 124, 126 can be a coiled spring, a pliant material, a section of rubber, a section of silicon, a section of a sponge, an inflated element, and the like.

Figure 3:
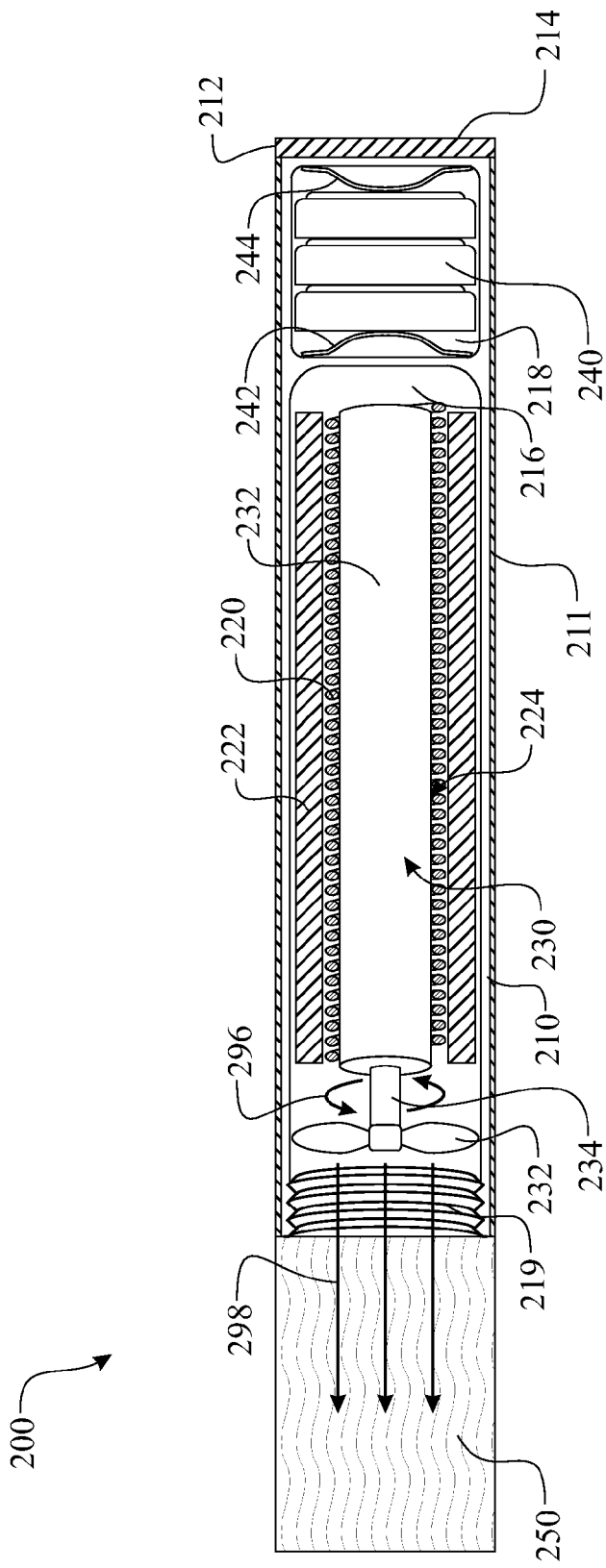
FIG. 3 presents a sectioned side view of a second exemplary embodiment of an airflow driven power generating electronic cigarette, the cigarette having an exterior appearance similar to the power generating electronic cigarette introduced in FIG. 1.

A power generating electronic cigarette 200, in accordance with a second exemplary embodiment, is presented in FIG. 3. Similar to the power generating electronic cigarette 100, the power generating electronic cigarette 200 is segmented in two components, an electronic cigarette body 210 and a replaceable refill filter cartridge 250. Unless otherwise indicated, like features of power generating electronic cigarette 200 and power generating electronic cigarette 100 are numbered the same except preceded by the numeral '2'.

The power generating subassembly utilizes a rotating magnet 230 rotationally assembled within a coil inner channel 224 of the electrical coil 220. One or more coil periphery magnets 222 are located about an outer periphery of the electrical coil 220. A plurality of coil periphery magnets 222 can be spatially arranged about an external periphery of the electrical coil 220. A magnet rotational axle 234 extends from a concentric location of the rotating magnet 230, extending outward along a central longitudinal axis thereof. An airflow driven rotator 232 is affixed to the magnet rotational axle 234, preferably at a proximal end thereof. The airflow driven rotator 232 is subjected to airflow 298, causing the airflow driven rotator 232 to rotate in accordance with a charging rotational motion 296. In turn, the charging rotational motion 296 of the airflow driven rotator 232 is transferred to the rotating magnet 230 via the magnet rotational axle 234, causing the rotating magnet 230 to spin. The spinning motion generates a current through the electrical coil 220. The current is passed through a portable power storage media 240 using a charging circuit similar to the charging circuit described above, which stores at least a portion of the generated electrical power.

In a modified version, the electrical coil 220 can be affixed to the rotating magnet 230, wherein the electrical coil 220 is rotationally inserted within an interior channel formed within the coil periphery magnet or magnets 224. The electrical coil 220 would spin in conjunction with the rotating magnet 230, creating a current within the electrical coil 220.

Figure 4:
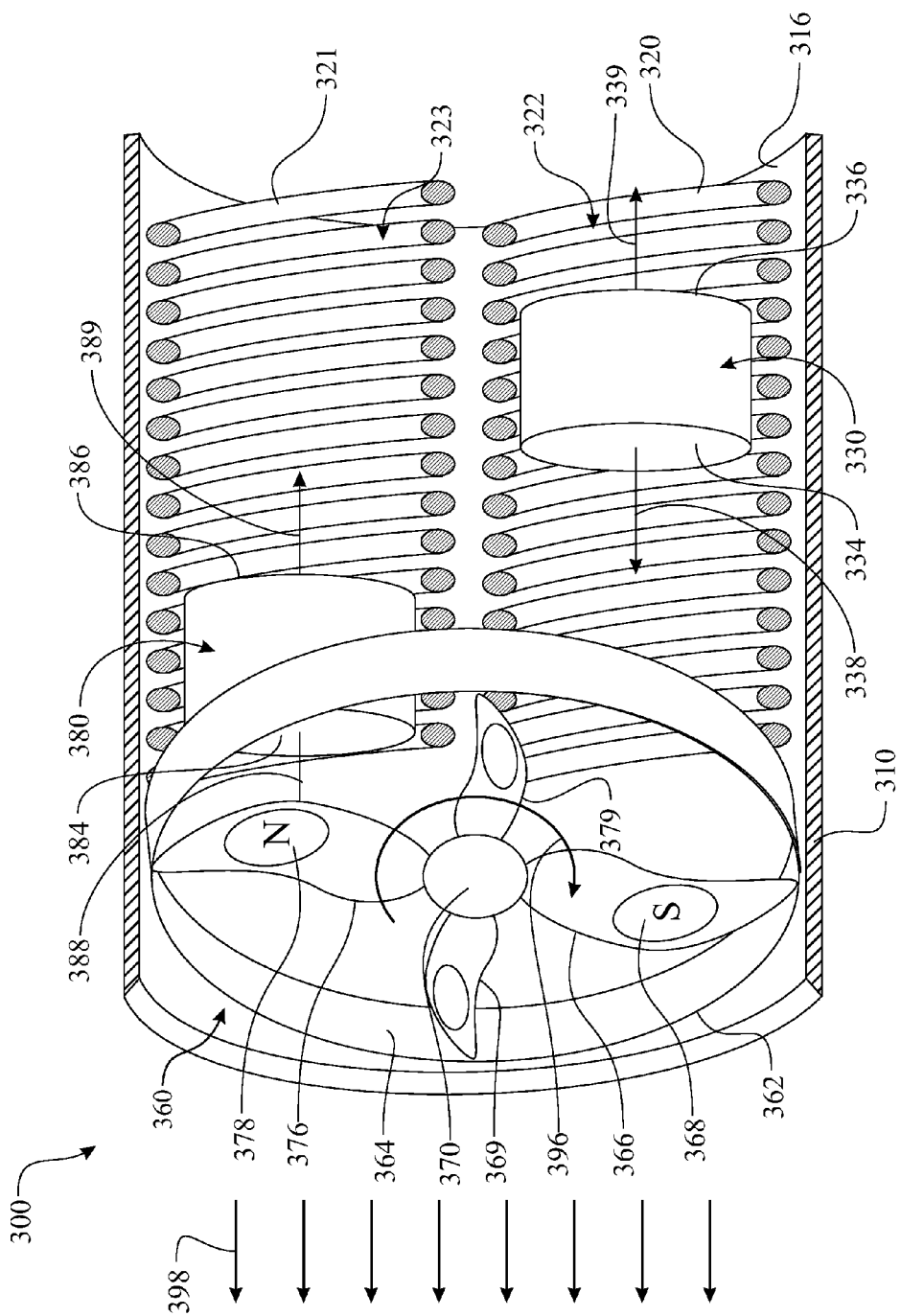
FIG. 4 presents a partially sectioned side view of a power generating subassembly of a third exemplary embodiment of an airflow driven power generating electronic cigarette.

A power generating electronic cigarette 300, in accordance with a third exemplary embodiment, is presented in FIG. 4.

The illustration presents an enlarged view of the power generating subassembly of the power generating electronic cigarette 300, omitting other functional components previously disclosed above. Similar to the power generating electronic cigarette 100, the power generating electronic cigarette 300 is segmented in two components, an electronic cigarette body 310 and a replaceable refill filter cartridge. Unless otherwise indicated, like features of power generating electronic cigarette 300 and power generating electronic cigarette 100 are numbered the same except preceded by the numeral '3'.

The power generating subassembly utilizes an airflow driven actuator 360 in conjunction with at least one coil subassembly. The first exemplary coil subassembly includes a first linearly moving magnet 330 passing through a respective coil inner passage 322 of an electrical coil 320. The first linearly moving magnet 330 can be described as having a cylindrical exterior shape 332 extending between a first magnet first end 334 and a first magnet second end 336. The first linearly moving magnet 330 is slideably inserted within the respective coil inner passage 322 of the electrical coil 320. It is understood that a non-magnetic tubular sleeve may be deployed within the first coil inner passage 322 for the same purposes as the sleeve described above.

The airflow driven actuator 360 includes a blade assembly comprising a plurality of blades extending radially outward from a blade axle 370. The blade assembly can be positioned within a shroud interior 364 of an actuator shroud 362. The blade axle 370 is rotationally assembled to the power generating subassembly. In the exemplary embodiment, the airflow driven actuator 360 includes bracket rotationally connecting the blade axle 370 to the actuator shroud 362. At least one south magnetically polarized element 368 is carried by at least one of the blades 366, 376 of the blade assembly. In the exemplary embodiment, the blade assembly includes a south magnetically polarized element 368 carried by a south magnetic blade 366 and a north magnetically polarized element 378 carried by a north magnetic blade 376. The blade assembly can include additional blades 369, 379, which can either include or exclude magnets. In the exemplary embodiment, the south magnetically polarized element 368 is oriented polar opposite to the north magnetically polarized element 378.

The exemplary power generating subassembly comprises a second coil assembly replicating the elements of the first coil assembly. The second coil is identified as a second electrical coil 321, defining a first coil inner passage 323 passing through the windings of the second electrical coil 321. The elements of the second linearly moving magnet 380 are the same as the elements of the first linearly moving magnet 330, wherein like features are numbered the same except preceded by the numeral '38'. The first linearly moving magnet 330 and second linearly moving magnet 380 can be oriented with like polarities facing similar directions or opposite directions.

In operation, airflow 398 causes the blade assembly to rotate in accordance with a blade assembly rotational motion 396. The blade assembly rotational motion 396 rotates the blade assembly passing the magnetically polarized elements 368, 378 across the linearly moving magnets 330, 380. As opposite polarities of the magnetically polarized elements 368, 378 and the linearly moving magnets 330, 380 pass across one another, they attract, drawing the linearly moving magnets 330, 380 towards the airflow driven actuator 360 in accordance with an attracting motion 338, 388. As like polarities of the magnetically polarized elements 368, 378 and the linearly moving magnets 330, 380 pass across one another, they repel, separating the linearly moving magnets 330, 380 from the airflow driven actuator 360 in accordance with a repelling motion 339, 389. The motion of the linearly moving magnets 330, 380 passing across the coils 320, 321 creates a current within the coils 320, 321. A circuit created by the electrical coils 320, 321, electrically conductive material, and contacts, provides a charging circuit to replenish electrical energy within the portable power storage media.

It is understood that the linearly moving magnets 330, 380 can be arranged with like polarities oriented in like direction causing the linearly moving magnets 330, 380 to move in opposite directions. Similarly, the linearly moving magnets 330, 380 can be arranged with like polarities oriented in opposite direction causing the linearly moving magnets 330, 380 to move in a parallel relation to each other.

The exemplary power generating subassembly can be modified utilizing magnetically polarized elements 368, 378 oriented with like polarities in like directions. A biasing member can be provided in communication with the linearly moving magnets 330, 380. The magnetically polarized elements 368, 378 either attract or repel the linearly moving magnets 330, 380 based upon the orientation of the polarities of the magnetic components. The interactive force between the magnetically polarized elements 368, 378 and the linearly moving magnets 330, 380 overcomes a biasing force generated by the biasing member. When the blade assembly rotates removing the interactive force between the magnetically polarized elements 368, 378 and the linearly moving magnets 330, 380, the biasing force returns the linearly moving magnets 330, 380 to a normal position. The biasing member can be a coil spring, a linear spring, and the like. When the magnetically polarized elements 368, 378 are oriented to attract the linearly moving magnets 330, 380, the biasing member would be designed to separate the magnetically polarized elements 368, 378 and the linearly moving magnets 330, 380. When the magnetically polarized elements 368, 378 are oriented to repel the linearly moving magnets 330, 380, the biasing member would be designed to bring the magnetically polarized elements 368, 378 and the linearly moving magnets 330, 380 together.

Figure 5:
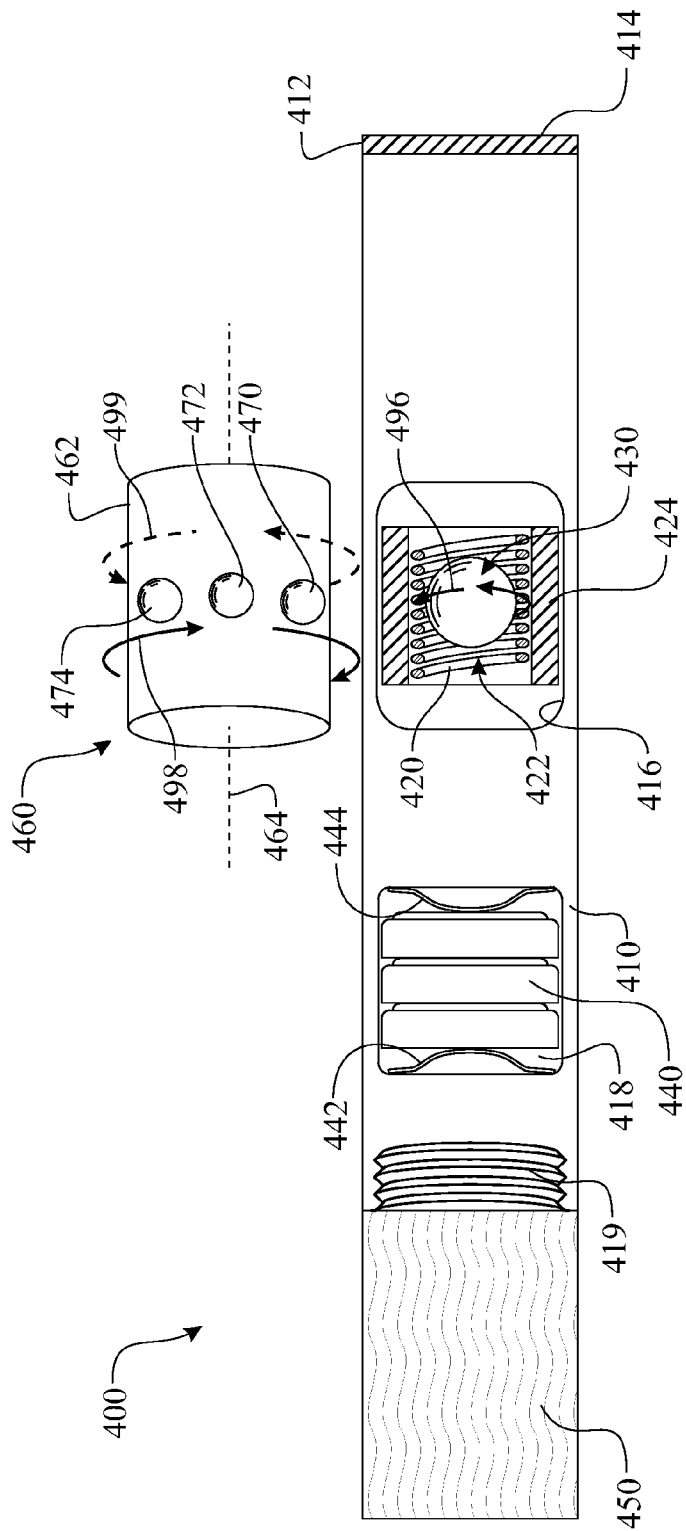
FIG. 5 presents an enlarged sectioned side view of a fourth exemplary embodiment of an externally driven power generating electronic cigarette.

A power generating electronic cigarette 400, in accordance with a fourth exemplary embodiment, is presented in FIG. 5. Similar to the power generating electronic cigarette 100, the power generating electronic cigarette 400 is segmented in two components, an electronic cigarette body 410 and a replaceable refill filter cartridge 450. Unless otherwise indicated, like features of power generating electronic cigarette 400 and power generating electronic cigarette 100 are numbered the same except preceded by the numeral '4'.

The power generating electronic cigarette 400 incorporates a power generating subassembly integrated within an electrical generator cavity 416 of the electronic cigarette body 410, wherein the power generating subassembly generates an electrical output when subjected to an externally moving magnet or series of magnets.

The power generating subassembly creates an electrical power output to replenish electrical power stored within a portable power storage media 440. The power generating subassembly includes a rotating magnetic sphere 430 rotationally assembled within a coil interior portion 422 of an electrical coil 420. The electrical coil 420 is sized to retain the rotating magnetic sphere 430 from moving along the longitudinal axis of the electronic cigarette body 410. A non-magnetic sleeve (not shown) can be inserted within the coil interior portion 422 or placed about the rotating magnetic sphere 430 to improve longevity of the electronic cigarette body 410, reduce friction between the rotating magnetic sphere 430 and the electrical coil 420, and the like. Although the exemplary rotating magnetic sphere 430 is a sphere, it is understood that the rotating magnetic sphere 430 can be provided in any acceptable shape, such as a cylinder.

A wireless power actuator 460 is provided to magnetically interact with the rotating magnetic sphere 430, driving a magnetic sphere rotational motion 496 of the rotating magnetic sphere 430. The wireless power actuator 460 is fabricated having one or more magnets 470, 472, 474 carried by a power actuator casing 462. In operation, the wireless power actuator 460 is locate proximate the electrical coil 420 and rotated about a power actuator central axis 464. The wireless power actuator 460 can be rotated in either a clockwise rotation 498 or a counterclockwise rotation 499. The rotational motion 498, 499 of the wireless power actuator 460 interacts with the rotating magnetic sphere 430, causing the magnetic sphere rotational motion 496 of the rotating magnetic sphere 430. As the rotating magnetic sphere 430 rotates within the coil interior portion 422, the rotating motion of the rotating magnetic sphere 430 creates a current along the windings of the electrical coil 420. The current can be converted into stored electrical power.

Alternately, an optional coil periphery magnet 424 can be integrated about an external surface of the electrical coil 420. The coil periphery magnet 424 can be fixed or rotationally assembled therein. The power generating subassembly can be configured enabling the coil periphery magnet 424 to rotate in conjunction with the rotational motion 498, 499 of the wireless power actuator 460. The motion of the coil periphery magnet 424 generates a current along the windings of the electrical coil 420.

The electrical coils 120, 220, 320, 321, 420 can be fabricated using any common coil materials, including copper wire, and the like. The coil wire is preferably coated with an insulating material. The electrical coils can be encapsulated with any reasonable material. A non-magnetic and non-conductive material can be placed covering an interior surface, an exterior surface, or both surfaces of the coil windings.

It is understood that a voltage or charging regulation circuit can be integrated within the charging circuits described above.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A power generating electronic cigarette, comprising:
    an elongated electronic cigarette body comprising a tubular structure having a proximal end and an enclosed distal end, and being at least partially hollow so as to define a cavity between the proximal and distal ends;
    a filter cartridge configured to provide consumable components of the power generating electronic cigarette, the filter cartridge being attached at the proximal end of the tubular structure of the elongated electronic cigarette body;
    a portable power storage media configured to store electrical power to operate the consumable components of the filter cartridge, the portable power storage media being assembled within the tubular structure of the elongated electronic cigarette body; and
    a power generating subassembly comprising components disposed in a charging circuit with the portable power storage media, the components being configured to interact with one another and generate electrical power, in response to a motive force applied to at least one of the components, to transfer electrical power via the charging circuit to replenish the electrical power stored within the portable power storage media, wherein the motive force is generated by motion of air due to inhaling or exhaling, the components of the power generating subassembly being assembled within the cavity of the tubular structure of the elongated electronic cigarette body.

2. The power generating electronic cigarette as recited in claim 1, wherein the tubular structure of the elongated electronic cigarette body further comprises an internal frame and a hollow external shell slidably assembled over the internal frame, wherein at least a portion of the cavity of the tubular structure of the elongated electronic cigarette body is formed within the internal frame.

3. The power generating electronic cigarette as recited in claim 1, wherein the components of the power generating subassembly comprise an electrical coil and a linearly moving magnet slidably assembled within an inner passage of the electrical coil.

4. The power generating electronic cigarette as recited in claim 3, wherein the power generating subassembly further comprises a coil lining provided between the linearly moving magnet and the electrical coil inner passage.

5. The power generating electronic cigarette as recited in claim 3, wherein:
    the tubular structure of the elongated electronic cigarette body at the proximal end thereof has an electromechanical filter coupling element; and
    the filter cartridge is a refill filter cartridge removably attached to the electromechanical filter coupling element.

6. The power electronic cigarette as recited in claim 3, wherein the cavity of the tubular structure of the elongated electronic cigarette body includes an electrical generator cavity, and wherein the electrical coil is located within the electrical generator cavity and extends along an entire length of the electrical generator cavity.

7. The power generating electronic cigarette as recited in claim 1, the cavity of the tubular structure of the elongated electronic cigarette body includes an electrical generator cavity, and wherein the electrical coil is located within the electrical generator cavity and extends partially along a length of the electrical generator cavity, forming a gap between at least one end of the electrical coil and a proximate end of the electrical generator cavity.

8. A power generating electronic cigarette, comprising:
    an elongated electronic cigarette body comprising a tubular structure having a proximal end and an enclosed distal end, and being at least partially hollow so as to define at least an electrical generator cavity between the proximal and distal ends:
    a filter cartridge configured to provide consumable components of the power generating electronic cigarette, the filter cartridge being attached at the proximal end of the tubular structure of the elongated electronic cigarette body;
    a portable power storage media configured to store electrical power to operate the consumable components of the filter cartridge, the portable power storage media being assembled within the tubular structure of the elongated electronic cigarette body; and
    a power generating subassembly comprising components disposed in a charging circuit with the portable power storage media, the components being configured to interact with one another and generate electrical power, in response to a motive force applied to at least one of the components, to transfer electrical power via the charging circuit to replenish the electrical power stored within the portable power storage media, wherein the motive force is generated by motion of air due to inhaling or exhaling, the components of the power generating subassembly comprising an electrical coil assembled within the electrical generator cavity, a linearly moving magnet slidably assembled within an inner passage of the electrical coil, and a dampening member located at one end of the electrical generator cavity, wherein the dampening member provides deceleration to the linearly moving magnet when sliding within the inner passage of the electrical coil in a first direction.

9. The power generating electronic cigarette as recited in claim 8, wherein the tubular structure of the elongated electronic cigarette body further comprises an internal frame and a hollow external shell slidably assembled over the internal frame, wherein the electrical generator cavity is formed within the internal frame.

10. The power generating electronic cigarette as recited in claim 8, wherein the components of the power generating subassembly further comprise a second dampening member located at an end of the electrical generator cavity opposite the first dampening member, wherein the second dampening member provides deceleration to the linearly moving magnet when sliding within the inner passage of the electrical coil in a second direction being opposite to the first direction.

11. The power generating electronic cigarette as recited in claim 8, wherein the power generating subassembly further comprises a coil lining provided between the linearly moving magnet and the electrical coil inner passage.

12. The power generating electronic cigarette as recited in claim 8, wherein:

the tubular structure of the elongated electronic cigarette body at the proximal end thereof has an electromechanical filter coupling element; and the filter cartridge is a refill filter cartridge removably attached to the electromechanical filter coupling element.

13. The power generating electronic cigarette as recited in claim 8, wherein the electrical coil is located within the electrical generator cavity and extends along an entire length of the electrical generator cavity.

14. The power generating electronic cigarette as recited in claim 8, wherein the electrical coil is located within the electrical generator cavity and extends partially along a length of the electrical generator cavity, forming a gap between at least one end of the electrical coil and a proximate end of the electrical generator cavity.

15. A power generating electronic cigarette, comprising:

an elongated electronic cigarette body comprising a tubular structure having a proximal end and an enclosed distal end, and being at least partially hollow so as to define at least an electrical generator cavity between the proximal and distal ends;

a filter cartridge configured to provide consumable components of the power generating electronic cigarette, the filter cartridge being attached at the proximal end of the tubular structure of the elongated electronic cigarette body;

a portable power storage media configured to store electrical power to operate the consumable components of the filter cartridge, the portable power storage media being assembled within the tubular structure of the elongated electronic cigarette body; and a power generating subassembly comprising components disposed in a charging circuit with the portable power storage media, the components being configured to interact with one another and generate electrical power, in response to a motive force applied to at least one of the components, to transfer electrical power via the charging circuit to replenish the electrical power stored within the portable power storage media, wherein the motive force is generated by motion of air due to inhaling or exhaling, the components of the power generating subassembly comprising an electrical coil assembled within the electrical generator cavity, and a moving magnet moveably assembled within an inner passage of the electrical coil.

16. The power generating electronic cigarette as recited in claim 15, wherein the tubular structure of the elongated electronic cigarette body further comprises an internal frame and a hollow external shell slidably assembled over the internal frame, wherein the electrical generator cavity is formed within the internal frame.

17. The power generating electronic cigarette as recited in claim 15, wherein the moving magnet is rotationally assembled within the inner passage of the electrical coil.

18. The power generating electronic cigarette as recited in claim 16, wherein the components of the power generating subassembly further comprise an airflow driven rotator wherein the airflow driven rotator rotates the moving magnet when subjected to an airflow applied to an interior of the tubular structure of the elongated electronic cigarette body.

19. The power generating electronic cigarette as recited in claim 15, wherein the components of the power generating subassembly further comprise at least one coil periphery magnet located about an external periphery of the electrical coil.

20. The power generating electronic cigarette as recited in claim 15, wherein the components of the power generating subassembly further comprises a plurality of coil periphery magnets spatially arranged about an external periphery of the electrical coil.

* * * * *